United States Patent [19]

Loy et al.

[11] Patent Number: 4,840,465

[45] Date of Patent: Jun. 20, 1989

[54] DEVICE FOR CORRECTING DISTORTION

[75] Inventors: Fernand R. Loy, Sceaux; Jean-Claude Perrin, Macon; Joël Rollin, Vanves, all of France

[73] Assignee: U.S. Philips Corporation, New York, N.Y.

[21] Appl. No.: 123,034

[22] Filed: Nov. 19, 1987

[30] Foreign Application Priority Data

Nov. 21, 1986 [FR] France ................. 86 16234

[51] Int. Cl.$^4$ ............... G02B 13/10; G02B 27/14
[52] U.S. Cl. ........................... 350/421; 350/174
[58] Field of Search ............ 350/420, 421, 174, 286

[56] References Cited

U.S. PATENT DOCUMENTS 4,245,890 1/1981 Hartman et al. ............. 350/413
4,580,879 4/1986 Wilson ......................... 350/421

Primary Examiner—Bruce Y. Arnold
Assistant Examiner—Scott J. Sugarman

[57] ABSTRACT

Device for correcting the differential distortion resulting from simultaneous observation of a field of view at two distinct locations through a shield transparent in a given spectral band, which shield has a shape generating the distortion when a receiver which is sensitive in the spectral band is arranged at each of the locations. The correction is effected by an optical system arranged between the shield and one or the other receiver and comprising an anamorphic assembly (11, 12) producing an anamorphosis in a first direction associated with an element (13) introducing a curvature in a second direction, while the distortion produced by this system has a direction opposite to the differential distortion.

6 Claims, 2 Drawing Sheets

DEVICE FOR CORRECTING DISTORTION

BACKGROUND OF THE INVENTION

The invention relates to a device for correcting the differential distortion resulting from simultaneous observation of a field of view at two distinct locations through a transparent shield in a given spectral band, which shield has a shape generating a distortion without rotational symmetry, when the images received by a first and a second receiver sensitive in the spectral band and arranged each at one of the locations are superimposed.

Numerous sighting or registering devices (CCD camera, vidicon) on board airplanes must take the presence of a cockpit window into account whose shape (for example, conical) distorts the view of the landscape: an airplane on a test flight, for example is equipped with a video camera whose image is recaptured by means of a goggle at eye level in order to be superimposed on the image received by the pilot's eye. Since this camera cannot be placed near the pilot's head, the distortion introduced by the cockpit window is not the same to the pilot's eye and the camera because the optical beams traverse the cockpit window at different heights, which creates deviations of an asymmetrical nature. These deviations may be quite considerable (of the order of one degree): it is thus necessary to correct or at least reduce them. In certain cases an electronic correction by means of digital processing of the image entails complex and bulky systems.

SUMMARY OF THE INVENTION

It is an object of the invention to provide a correction of an optical nature which does not alter the resolution of the image and which is simple, compact and easily controllable.

The first condition precludes any possibility of correction within the camera: the solutions of the type tilting or deforming the reception surface generally degrade the quality of the image and require considerable modifications of the mechanical set-up and of optical calculations.

The correction device comprises an optical system of a modular structure using parallel beams and arranged between the shield and a receiver. The system introduces a distortion having curvature and variation of the length of the lines opposite to those of the differential distortion, the correction device providing approximately a correction value which renders the residual distortion acceptable.

The optical correction system has two functions whose order may be reversed: an anamorphic function creating the length variation in one direction and an aberrating function forming the curvature in another direction, the angle of the directions being adjustable to any value for simulating any form of distortion. The anamorphic and aberrating functions are realized by means of independent groups of optical elements. As these two functions are independent, it is possible to correct any distortion resulting from a curvature, an anamorphosis or a combination of the two faults.

The optical correction system realized, for example by means of prisms has only plane surfaces and does not degrade the image if it is achromatized and uses parallel beams.

DETAILED DESCRIPTION OF THE PREFERRED EMBODIMENT

Figure 1:
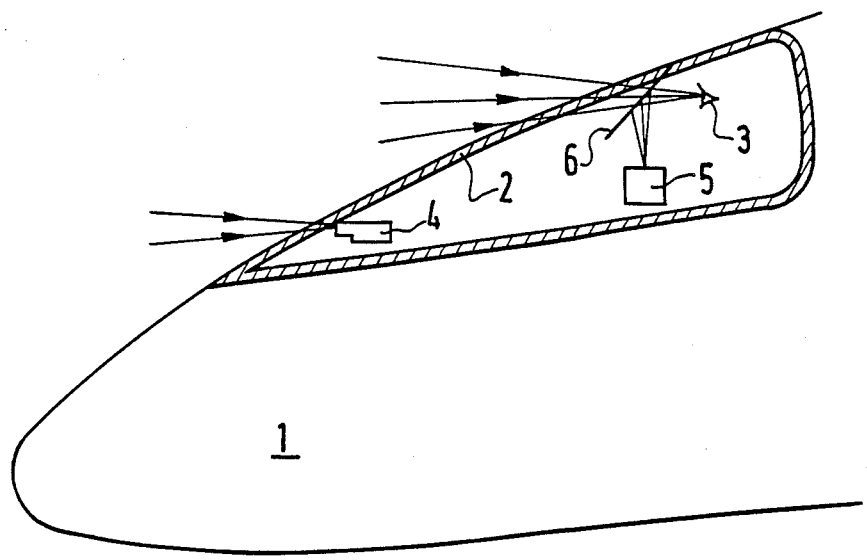
FIG. 1 illustrates the problem.

FIG. 1 shows the front profile 1 of the fuselage of an aircraft whose window 2 having the form of a cone portion is constituted by a material transparent in a given spectral band. Through this window the pilot's eye 3 covers the same field of view as a camera 4 situated at a lower level and operating in the same spectral band. The image generated by the camera is sent to the pilot by means of a goggle at eye level comprising a television monitor 5, which is collimated to infinity, and a semitransparent mirror 6. The image formed by the camera is superimposed on the landscape as seen by the pilot. The display system may project given useful indications on this image such as the altitude of the aircraft, its speed, the horizon etc. The difference between the radii of curvature of the cockpit window at different levels generates a given difference in distortion between the observer and the camera so that the superposition is not perfect. It is this deviation which is to be reduced.

Figure 2:
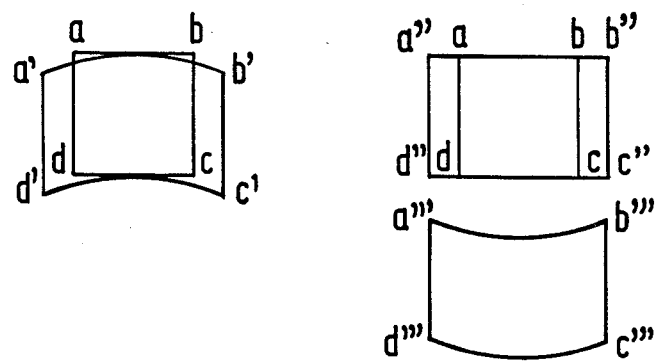
FIG. 2 shows the shape a'b'c'd' of the differential distortion to be corrected and a'''b'''c'''d''' of the distortion introduced by the correction system.

FIG. 2 shows the form of the differential distortion brought about by the cockpit window and that which must be introduced by the correction device.

A square abcd is distorted by the window into a'b'c'd' between the level of the camera A and the level of the pilot's eye 3. As the lines a'd' and b'c' remain perpendicular to the side ab of the square, a correction device may be used in this example, realizing an anamorphosis in the horizontal section plane and a curvature in the vertical section plane.

This device then transforms the original square into a rectangle a''b''c''d'' and the curvature introduced at a'''b''' and c'''d''' will be opposite to that produced between the camera and the pilot's eye.

Figure 3:
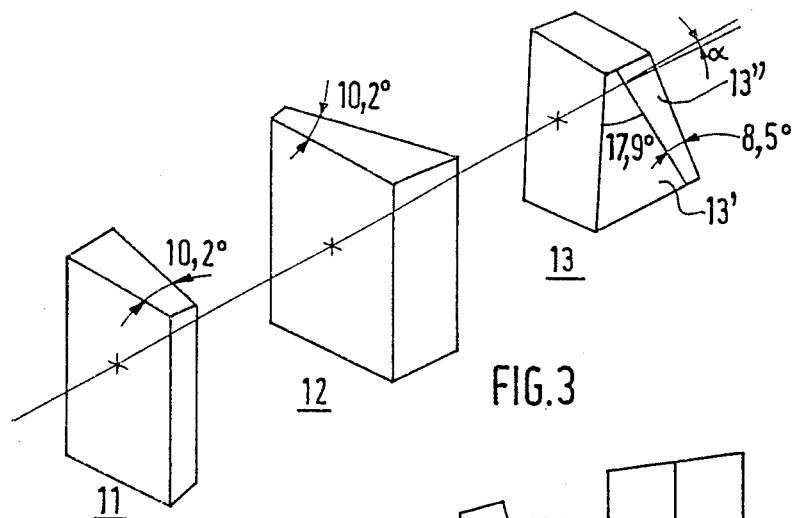
FIG. 3 is a perspective view of the device according to the invention.

According to the invention the correction is effected by means of an optical system having a modular structure arranged before the camera, which system is shown in a perspective view in FIG. 3.

This system effects the correction in the horizontal section plane by making an anamorphosis by means of an anamorphic assembly using two prisms 11 and 12. These two prisms, which have the same angle and are cut from the same material, are arranged head-to-tail so that this assembly does not deflect the beams and thus does not cause any chromatism. If the coefficient of anamorphosis is low, the anamorphosis remains substantially constant in the field.

The correction in the vertical section plane is ensured by a deflecting prism 13 arranged behind the anamorphic assembly 11, 12. This prism 13 introduces on the image of a gap parallel to the edge of the prism a curvature whose concavity is directed to the base of the prism. This curvature is caused by the fact that the prism is not struck at the same angle by the rays from the centre and the rays from the edge of the gap projected.

The curvature depends on the angle of the prism, its refractive index and the angle of incidence; the image of the optical axis of the camera is thus deflected through an angle $\alpha$.

The nominal direction of sight can be maintained by mechanically tilting the assembly of camera+prisms.

For certain uses it is necessary to achromatize the deflecting prism 13 by constituting it from two cemented pieces 13' and 13" whose angles and refractive indices have the appropriate values.

Figure 4A:
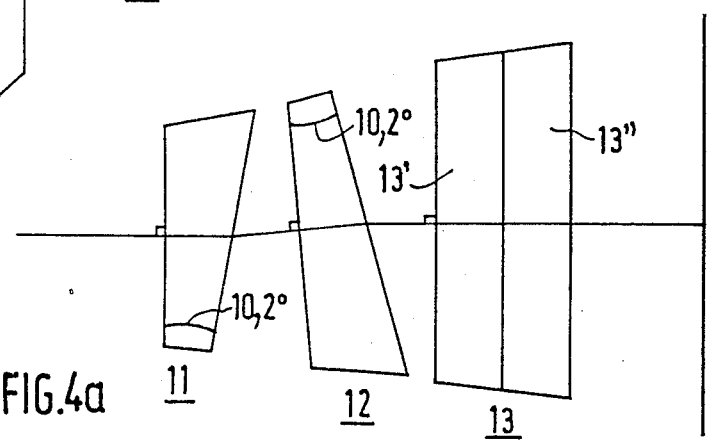
FIGS. 4a and 4b are horizontal and vertical cross-sections of an embodiment of the device.
Figure 4B:
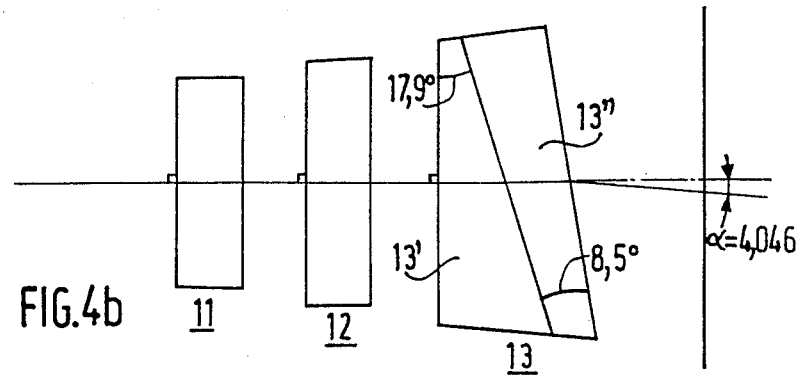

FIGS. 4a and 4b show the device in horizontal cross section respectively.

An embodiment of the prism system with a given distance between the observer and the camera has the following parameters:

Angle of the anamorphotic prisms 11, 12: 10.2°.
Angle of the deflecting prisms 13', 13": 17.9° and 8.5°.
Residual chromatism: 0.2 mrd.
Deviation of the camera optical axis: $\alpha=4.046°$.

The proposed solution thus has the advantage of reducing an asymmetrical distortion without altering the performance of the registering system.

As the device according to the invention has a simple and less bulky construction, it can be combined with a registering camera in flight to partly solve the problems of distortion encountered when superimposing images received by two receivers located at different levels of the cockpit window.

What is claimed is:

1. A device correcting the differential distortion resulting from superimposing the images received by first and second receivers sensitive in a given spectral band, said images resulting from simultaneous observation of a field of view at two distinct locations through a shield transparent in said given spectral band, said shield having a shape generating distortion without rotational symmetry, said device comprising an optical correction system having a modular structure using parallel beams and being arranged between said shield and said second receiver, said system introducing a distortion having a curvature and variation of length of lines opposite those of said differential distortion.

2. A device as claimed in claim 1, characterized in that the optical correction system has an anamorphic function creating the length variation in a first direction and an aberrating function forming the curvature in a second direction, the angle of the directions being adjustable to any value for simulating any form of distortion and the anamorphic and deflecting functions being realized by means of independent groups.

3. A device as claimed in claim 2, characterized in that said first and second directions are mutually perpendicular.

4. A device as claimed in claim 2, characterized in that said first and second directions make an arbitrary angle with each other.

5. A device as claimed in claim 2, characterized in that the anamorphic function is realized by means of two prisms having the same angle and having the same refractive index and being arranged head-to-tail and in that the aberrating function is realized by means of a single prism.

6. A device as claimed in claim 5, characterized in that the chromatism introduced by the aberrating prism is corrected by the addition of another prism having a different angle and a different refractive index, said two prisms constituting an achromatic assembly.

* * * * *